United States Patent Office 2,968,205
Patented Jan. 17, 1961

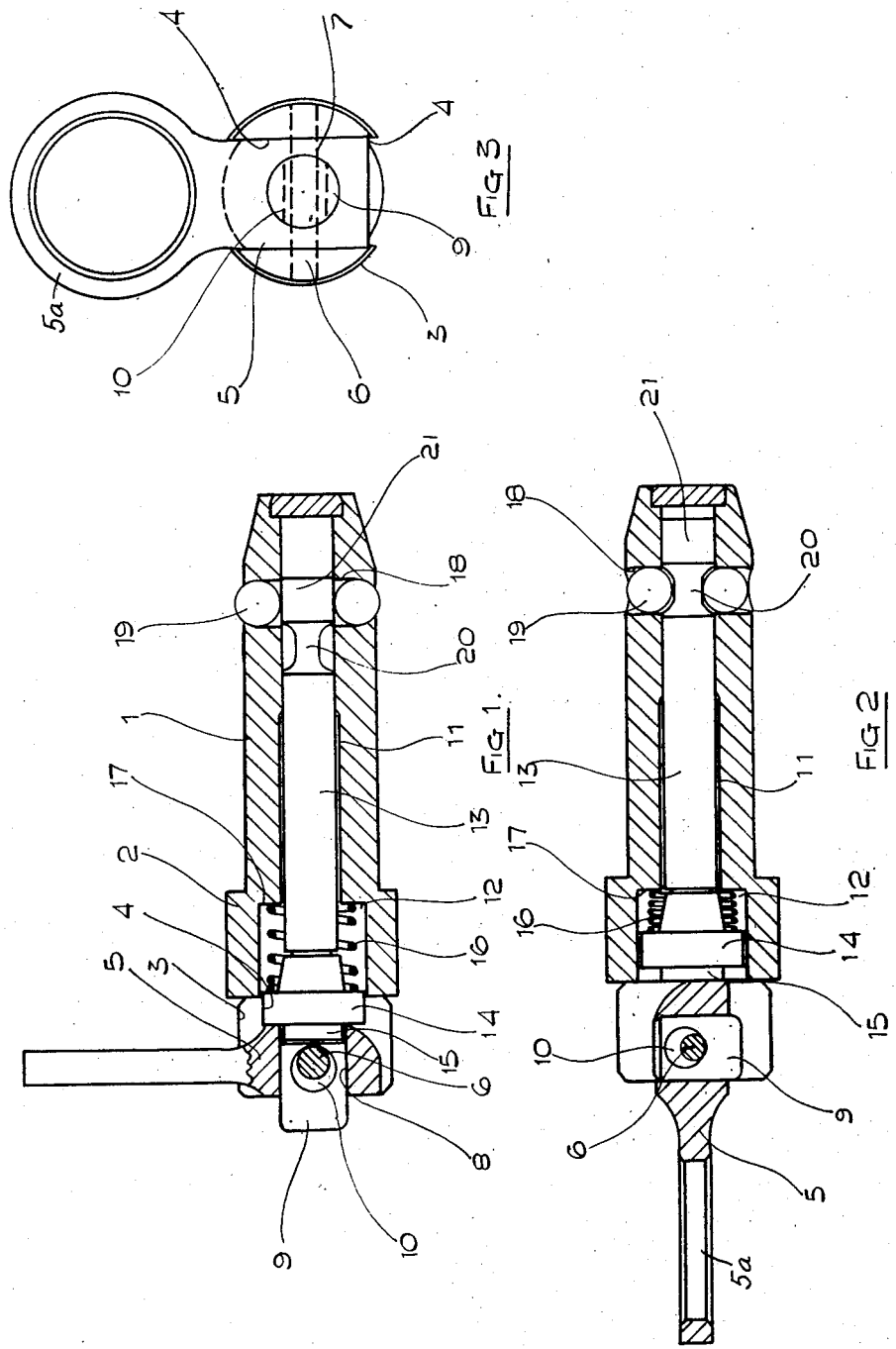

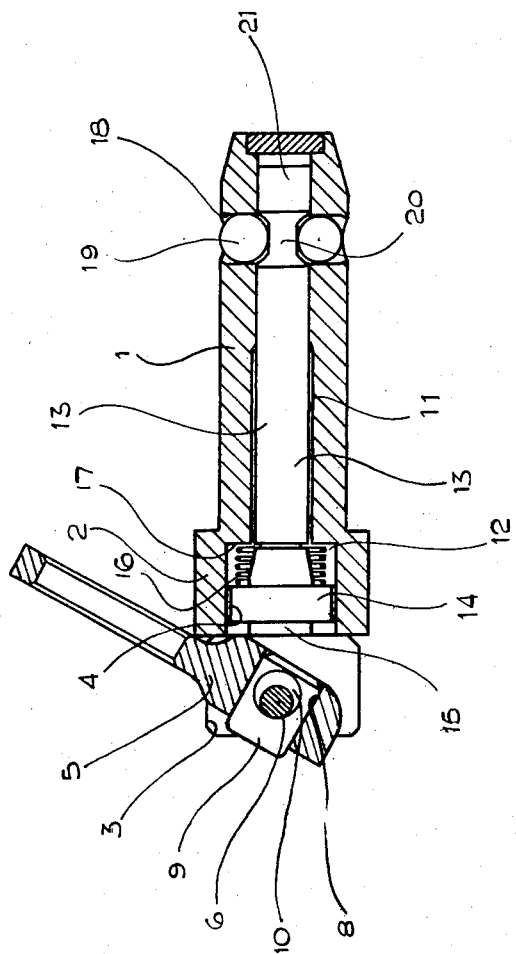

2,968,205
BALL DETENT FASTENER WITH CAM LEVER ACTUATING MEANS

Maurice Stanley Springate, Oaklands, England, assignor to Aviation Developments Limited, Welwyn Garden City, Herts, England Filed Mar. 2, 1953, Ser. No. 339,534
Claims priority, application Great Britain Mar. 3, 1952
6 Claims. (Cl. 85—5)

This invention relates to quick release fasteners of the kind, commonly used on aircraft, comprising a flanged or headed radially apertured tubular member and a plunger formed with a cam-like part and spring influenced to tend to assume in the tubular member a position in which the said cam-like part co-operates with locking elements accommodated in the radial apertures to urge them outwardly into locking position, the device being pushed through holes in the members to be fastened together until the flange or head of the tubular member bears there against at one side thereof and the plunger is then released to urge the locking elements radially outwards at the other side thereof.

A fastener of this type may be released instantaneously from the locking position by pulling a ring or pushing a button which actuates the spring influenced plunger. It is, however, desirable in some applications of the fastener, especially on aircraft, for example, to provide measures against accidental release of the plunger of the fastener, thus preventing the unintentional displacement of the plunger.

Accordingly, the invention has for an object the provision of an additional locking means so as to prevent accidental release of the fastener.

According to the invention a quick release fastener comprises a headed radially apertured tube, at least one locking member movable in the radial apertures, a plunger formed with a transverse deformation of its body, which plunger is spring loaded into its locking position, a manually operable bored cam pivoted on the tube in such a position that the plunger in its locking position extends into the bore and prevents the cam from being pivoted on the tube, and a button, slidable within limits in the bore, which bears against the plunger, the arrangement being such that the fastener can be unlocked only by first manually moving the button against the plunger spring so as to push the plunger out of the bore, and then pivoting the cam so as to cam the plunger a further distance into its unlocked position.

Furthermore, according to the invention, the fastener comprises a headed radially-apertured tube, at least one locking member movable in the radial apertures, a spring loaded plunger in the tube formed with a transverse deformation which upon movement of the plunger in the tube, moves the locking members into and out of the locking position, and two manually operable latches interconnected in such a way that the locking members cannot be unlocked by movement of one latch which serves only to release the other latch which can then be operated to unlock the locking members.

According to a further feature of the invention a fastener comprises a headed radially apertured tube, at least one locking member movable in the radial apertures, a spring loaded plunger in the tube formed with a transverse deformation which upon movement of the plunger in the tube moves the locking members into and out of the locking position, and two manually operable latches both of which require to be operated to unlock the locking members, the one latch being capable of rectilinear movement and the other of angular movement.

In order to release the fastener from its locked position, the reciprocating button is pressed inwardly to assume position in which the free end of the plunger is clear of the aperture in the cam which latter is freed to rotate through an angle of 90°, thus shifting the spring influenced plunger into position where the locking elements are allowed to recede within the tubular member.

A preferred form of the invention will now be described with reference to the accompanying drawing in which:

Figure 1 is a sectional elevation showing the fastener in a locked position.

Figure 2 is a similar view to Figure 1 showing the fastener in released position.

Figure 3 is an end view of Figure 1.

Figure 4 is a similar view to Figure 2, but showing an alternative way of bringing the fastener into released position.

As shown in the drawing the fastener comprises a tubular element 1 having a head or external flange 2 and an integral extension piece 3 formed with a recess or slot 4 in which is housed a lever-operated cam 5 pivotally mounted on a pivot pin 6 passing through the slotted extension 3 of the tubular member 1. The pivot pin 6 extends through a hole 7 in the cam 5 and terminates at both its ends flush with the external surface of the extension piece 3. The cam 5 is formed with a central bore 8 intersecting the hole 7 to receive the button 9 which is arranged to reciprocate in the bore 8. The button 9 is formed with a circular transverse hole 10 by means of which it can be threaded on to the pivot 6. The bore 10 is of a substantially larger diameter than that of pivot 6 and the extent of the enlargement of the bore 10 relative to the diameter of the pivot 6 defines the stroke of the reciprocating button 9. One end of button 9 extends out of the bore 8 in a position to be depressed by the thumb of the hand which grips the handle of cam 5. The tubular member 1 is formed with a central bore 11 which is enlarged at 12 within the head 2. An axially movable plunger 13 is housed in the bore 11 so that its head 14 lies in the bore 12. The head 14 carries an extension 15. A compression spring 16 is also accommodated in the enlarged bore 12 bearing with its one end against the head 14 of the plunger 13, and with its other against an internal shoulder 17 of the tubular member 1.

The tubular member 1 is formed near its nose, with one or more radial passages such as 18 extending into the main bore 11; locking elements 19 e.g. balls or plungers, are movably arranged in the radial passages 18 which have a reduced diameter at the surface of the tubular member 1, thus preventing these elements 19 from escaping. Moreover, the plunger 13 is formed with a cam-like neck or annular recess 20 merging into a second head 21 of the same diameter as the remaining part of the plunger 13 which is housed in the bore 11. The extension 15 is adapted to enter the bore 8 in the cam 5. When the fastener is in the locked position i.e. with the axis of the cam 5 intersecting the axis of the plunger 13, the compression spring 16 urges the head 14 and thus the extension 15 to enter the bore 8, the button 9 being driven outwardly for a length equal to the difference between the diameters of the hole 10 and of the pivot 6. The cam 5 is thus immobilized or positively locked against movement so long as the extension 15 projects into the bore 8 as shown in Figure 1.

In order to release the fastener the button 9 is pressed against the spring until the extension 15 of the plunger 13 is clear of the bore 8 in the cam 5 thus disengaging the latter; the cam 5 may now be pivoted so as to push the plunger 13 a further distance into unlocked position in which the balls 16 are allowed to recede within the tubular element 1, as illustrated in Figure 2. This is accomplished by moving the operating lever of the cam from the position shown in Figure 1 to that shown in Figure 2. The fastener may now be removed from or inserted in the registering apertures in the members to be unlocked or secured together. To facilitate such removal, the outer end of the operating handle of cam 5 is formed as a ring portion 5a, the plane of the ring being at right angles to the axis of plunger 13 when the cam is in the locking position shown in Figures 1 and 3, and being in line with the axis of plunger 13 when the cam is in the unlocking position, as shown in Figure 2.

An alternative way of operating the plunger 13 into a released position by depressing the button 9 and thereafter the cam lever 5, is shown in Figure 4.

The provision of a manually operable cam in quick release fasteners is particularly recommended when the balls carry heavy loads. It has been found that the pulling rings are apt to deformation during the withdrawal of the fastener from the registering apertures in members to be locked together. It will be understood that other suitable means than those illustrated in the drawing may be provided in order to prevent the locking elements 19 from escaping.

I claim:

1. A quick-release fastener comprising a headed tube carrying radially movable locking members near one end thereof, a locking plunger mounted within said tube and being operable to move said locking members into and out of a locking position, a spring urging said plunger into the locking position, a cam pivotally mounted on the head of said tube and engaging the end of said plunger, said cam being manually operable from a first position in which said plunger is in locking position to a second position in which said plunger is operated by said cam into unlocking position, said cam being provided with a bore in the camming surface thereof to receive the end of said plunger when said cam is in said first position, whereby said plunger locks said cam against movement to said second position, and a manually operable push-button slidably mounted in said bore and engaging the end of said plunger for pushing said plunger out of said bore.

2. A quick-release fastener comprising a headed tube carrying radially movable locking members near one end thereof, a locking plunger mounted within said tube and being operable to more said locking members into and out of a locking position, a spring urging said plunger into the locking position, an operator for said plunger mounted on the head of said tube and engaging the end of said plunger, said operator being manually operable from a first position in which said plunger is in locking position to a second position in which said plunger is operated by said operator into unlocking position, said operator being provided with a recess to receive the end of said plunger when said operator is in said first position, whereby said plunger locks said operator against movement to said second position, and a manually operable push-button carried by said operator in a position to push said plunger out of said recess.

3. A quick-release fastener according to claim 1 wherein said cam is mounted for pivotal movement on a pivot pin which passes through an aperture in said push-button, the walls of said aperture determining the limits of the stroke of said push-button.

4. A quick-release fastener comprising a headed tube carrying radially movable locking members near one end thereof, a locking plunger mounted within said tube and being operable to move said locking members into and out of a locking position, operating means for effecting movement of said plunger into and out of the locked position and comprising a movable member having an operating handle for hand-operation thereof, spring-pressed latching means engaging said movable member in one position thereof to positively lock said operating means against movement of said plunger out of its locking position, and means for releasing said latching means comprising a movable releasing member mounted in a position to be depressed by the thumb of the hand which grips the handle of said operating means.

5. In a clevis pin of the character described comprising a tubular member adapted for insertion into a closely fitting cylindrical opening of a clevis and having a slotted head at one end adapted to limit movement of said member into said opening, at least one radial aperture in said member adjacent the end opposite said head, a ball radially movable in said aperture, means for moving said ball from a position in which said ball lies wholly within the periphery of said member to a position in which a portion of said ball extends beyond the periphery of said member comprising a stem slidably disposed within said member; said stem having a portion of reduced diameter adjacent said ball presenting a cam for moving said ball between said positions as an incident to movement of said stem within said member, and a spring between said member and said stem for moving said cam into engagement with said ball; a pivot pin extending transversely of said slotted head and having an axis intersecting a line coinciding with the axis of said stem, a lever pivotally mounted on said pin and having a cam portion thereon; said lever being movable from a first position in which the cam portion thereof lies entirely within the slot in said head to a second position in which said cam portion is effective to move said stem against the urge of said spring, thereby moving the cam on said stem out of engagement with said ball, and a ring mounted on one end of said lever on a line coinciding with the axis of said stem when said lever is in said second position.

6. In a clevis pin of the character described comprising a tubular member adapted for insertion into a closely fitting cylindrical opening of a clevis and having an enlarged head at one end adapted to limit movement of said member into said opening, said head having a slot formed across its outer end portion, at least one radial aperture in said member adjacent the end opposite said head, a ball radially movable in said aperture, means for moving said ball from a position in which said ball lies wholly within the periphery of said member to a position in which a portion of said ball extends beyond the periphery of said member comprising a stem slidably disposed within said member; said stem having a portion of reduced diameter adjacent said ball presenting a cam for moving said ball between said positions as an incident to movement of said stem within said member, and a spring between said tubular member and said stem for moving said cam into engagement with said ball; a pivot pin mounted in the slotted portion of said head and extending transversely of the slot in the head, a lever having one end portion located within said slot and pivotally mounted on said pin, said lever having a handle portion at one end thereof extending outside of said slot and a cam portion on the opposite side of said pin and located within said slot in a position to be engaged by the end of said stem; and means including said spring acting on said lever through said stem for resiliently holding said lever in a normal position with the handle portion thereof extending at right angles to the tubular member, said lever being movable from the said normal position to a second position in which said cam portion of the lever is effective to move said stem against the urge of said spring, thereby moving the cam on said stem out of engagement with said ball.

References Cited in the file of this patent

UNITED STATES PATENTS

| 854,073 | Bruckner | May 21, 1907 |
|---|---|---|
| 1,106,159 | Rawlins | Aug. 4, 1914 |
| 1,667,979 | Miller | May 1, 1928 |
| 2,159,655 | DeMooy | May 23, 1939 |
| 2,373,083 | Brewster | Apr. 3, 1945 |
| 2,393,072 | Skinner | Jan. 15, 1946 |
| 2,408,560 | Keehn | Oct. 1, 1946 |
| 2,547,326 | Kellogg | Apr. 3, 1951 |

FOREIGN PATENTS

| 932,459 | France | Mar. 23, 1948 |

UNITED STATES PATENT OFFICE
CERTIFICATE OF CORRECTION

Patent No. 2,968,205                      January 17, 1961

Maurice Stanley Springate

It is hereby certified that error appears in the above numbered patent requiring correction and that the said Letters Patent should read as corrected below.

Column 4, line 33, strike out "at one end adapted" and insert instead -- rigidly carried at one end of the member --; line 39, for "a" read -- an outer --; line 45, after "spring" insert -- acting --; line 46, after "ball" insert -- and normally holding said ball in its outer position --.

Signed and sealed this 20th day of February 1962.

(SEAL)
Attest:

ERNEST W. SWIDER                            DAVID L. LADD
Attesting Officer                                 Commissioner of Patents